US 8,429,052 B2

(12) United States Patent
Herr et al.

(10) Patent No.: US 8,429,052 B2
(45) Date of Patent: Apr. 23, 2013

(54) METHOD AND SYSTEM FOR PROVIDING EMPLOYER-SPONSORED RETIREMENT PLAN

(75) Inventors: Daniel P. Herr, South Windsor, CT (US); Robert J. Toth, Fort Wayne, IN (US)

(73) Assignee: Lincoln National Life Insurance Company, Fort Wayne, IN (US)

( * ) Notice: Subject to any disclaimer, the term of this patent is extended or adjusted under 35 U.S.C. 154(b) by 1086 days.

(21) Appl. No.: 11/488,317

(22) Filed: Jul. 18, 2006

(65) Prior Publication Data

US 2007/0033124 A1   Feb. 8, 2007

Related U.S. Application Data

(60) Provisional application No. 60/700,503, filed on Jul. 19, 2005.

(51) Int. Cl.
*G06Q 40/00* (2012.01)

(52) U.S. Cl.
USPC ........................ 705/36 R; 705/35; 705/36 T

(58) Field of Classification Search ........ 605/36
See application file for complete search history.

(56) References Cited

U.S. PATENT DOCUMENTS

| | | | |
|---|---|---|---|
| 4,055,757 A | 10/1977 | Tillman et al. |
| 4,742,457 A | 5/1988 | Leon et al. |
| 5,291,398 A | 3/1994 | Hagan |
| 5,631,828 A | 5/1997 | Hagan |
| 5,644,727 A | 7/1997 | Atkins |
| 5,704,045 A | 12/1997 | King et al. |
| 5,752,236 A | 5/1998 | Sexton et al. |
| 5,754,980 A | 5/1998 | Anderson et al. |
| 5,761,441 A | 6/1998 | Bennett |
| 5,839,118 A | 11/1998 | Ryan et al. |
| 5,864,828 A | 1/1999 | Atkins |
| 5,893,071 A | 4/1999 | Cooperstein |
| 5,926,792 A | 7/1999 | Koppes et al. |
| 5,930,760 A | 7/1999 | Anderton |
| 5,933,815 A | 8/1999 | Golden |
| 5,940,810 A | 8/1999 | Traub et al. |
| 6,058,377 A | 5/2000 | Traub et al. |
| 6,061,661 A | 5/2000 | Hagan |
| 6,064,969 A | 5/2000 | Haskins |

(Continued)

FOREIGN PATENT DOCUMENTS

GB           993766        2/1999

OTHER PUBLICATIONS

Genworth Financial; *Genworth Financial Brings Revolutionary Approach to 401(k) Industry*; News from PR Newswire; Globeinvestor.com; Apr. 13, 2005.

(Continued)

*Primary Examiner* — Leland Marcus
(74) *Attorney, Agent, or Firm* — Barnes & Thornburg LLP

(57) ABSTRACT

A computer-implemented method of administering income distributions from an employer-sponsored retirement plan having a participant account value provides an option to a plan participant to elect a lifetime payout funded by at least a portion of the participant's account value. The lifetime payout may be funded by a Plan Distributed Annuity ("PDA") or through the plan. An access period may be provided in the latter case, during which a participant maintains access to, and control over, the account.

24 Claims, 3 Drawing Sheets

U.S. PATENT DOCUMENTS

| | | | |
|---|---|---|---|
| 6,064,983 | A | 5/2000 | Koehler |
| 6,064,986 | A | 5/2000 | Edelman |
| 6,076,072 | A | 6/2000 | Libman |
| 6,085,174 | A | 7/2000 | Edelman |
| 6,105,865 | A | 8/2000 | Hardesty |
| 6,148,293 | A | 11/2000 | King |
| 6,253,192 | B1 | 6/2001 | Corlett et al. |
| 6,275,807 | B1 | 8/2001 | Schirripa |
| 6,611,815 | B1 | 8/2003 | Lewis et al. |
| 6,963,852 | B2 * | 11/2005 | Koresko .................... 705/35 |
| 7,089,201 | B1 | 8/2006 | Dellinger et al. |
| 7,376,608 | B1 | 5/2008 | Dellinger et al. |
| 7,398,241 | B2 * | 7/2008 | Fay et al. .................... 705/35 |
| 2002/0188540 | A1 * | 12/2002 | Fay et al. .................... 705/35 |
| 2002/0194098 | A1 * | 12/2002 | Stiff et al. .................... 705/36 |
| 2002/0198802 | A1 * | 12/2002 | Koresko .................... 705/35 |
| 2003/0187764 | A1 | 10/2003 | Abbs et al. |
| 2004/0088236 | A1 * | 5/2004 | Manning .................... 705/35 |
| 2004/0117202 | A1 * | 6/2004 | Winklevoss et al. ......... 705/1 |
| 2004/0172350 | A1 * | 9/2004 | Atkinson et al. ............ 705/35 |
| 2005/0055297 | A1 | 3/2005 | Gordon et al. |
| 2005/0060251 | A1 * | 3/2005 | Schwartz et al. ............ 705/35 |
| 2005/0144124 | A1 * | 6/2005 | Stiff et al. .................... 705/39 |
| 2006/0080148 | A1 * | 4/2006 | Koresko .................... 705/2 |
| 2006/0085338 | A1 * | 4/2006 | Stiff et al. .................... 705/40 |
| 2007/0011086 | A1 | 1/2007 | Dellinger et al. |
| 2007/0100727 | A1 | 5/2007 | Multer et al. |
| 2007/0255635 | A1 | 11/2007 | Multer et al. |
| 2008/0071661 | A1 | 3/2008 | Jeudy et al. |
| 2008/0133280 | A1 | 6/2008 | Ziegler |

OTHER PUBLICATIONS

Metropolitan Life Insurance Company 2004 Press Releases; *Metlife Retirement & Savings Introduces New Voluntary Employee Benefit for Retirement*; Apr. 27, 2004.

Metropolitan Life Insurance Company 2004 Press Releases; *Metlife Introduces "Longevity Insurance" to Help Protect Against Outliving Retirement Savings in Later Years*; Sep. 15, 2004.

Nationwide Financial news release; *Nationwide Financial® introduces Nationwide preVIEW™*; Mar. 11, 2004.

Genworth Life and Annuity Insurance Company's product brochure; *ClearCourse Overview*; Jun. 1, 2006.

1996 Prospectus by AXA/Equitable.

Minnesota Mutual Prospectus.

Rotello, Patricia A. "Developing an integrated retirement plan strategy, or does the shoe still fit?" Benefits Quarterly v9n4 pp. 61-65 Fourth Quarter 1993.

AnnuiSHARE™ Consumer Brochure, Version 1.20, Apr. 6, 1999; Cover: *AnnuiSHARE™ Lifetime Income Annuity; SHAREways to an enhanced and secure future in retirement*, (see inside cover, pp. 3-6, inside back cover and back cover).

*The Mechanics of Variable Annuitization*; by Jeffrey K. Dellinger, FSA, MAAA; Sep. 1994; Published in VARDS "Executive Series."

Internal Revenue Service Private Letter Ruling 9237030, Jun. 16, 1992 [Code Sec. 72].

Retirement Contribution Analyzer User Guide; Ernst & Young, LLP; Oct. 24, 1997; 19 pages.

A. Mody, D. Patro, Methods of Loan Guarantee Valuation and Accounting, 1995, Sitesources.worldbank.org. pp. 4-5 and 8-9.

Annuity Market News, "VA Patent Skirmishes in the Making?" Sep. 2005.

Sutherland, Asbill, & Brennan, LLP, p. 4 of an article discussing Minnesota Mutual Life Insurance Company's Guaranteed Minimum Annuity Payment Amount. (undated).

Memorandum from Ron Ziegler RE: Minnesota Mutual's Adjustable Income Annuity/Product Idea, Jan. 14, 1997.

*Annuity Insight*, Steve McDonnell, "VA Guaranteed Payout Floor Riders Stress the Annuitized Approach" Sep. 20, 2005.

Kerry Geurkink, "Creativity in the Annuity Payout Phase" (PowerPoint Presentation), Jun. 11, 1998.

Deanne Osgood, "Industry Research: VA Guaranteed Living Benefits" (PowerPoint Presentation) Jun. 11-12, 1998.

Tillinghast-Towers Perrin, "The Variable Immediate Annuity Marketplace;" handout dated Aug. 25, 1998.

Christine Ong, "Hartford Readies For-Life Withdrawal Benefits" (online article found at http://www.ignites.com; Sep. 29, 2005.

PR Newswire Online Article, "The Hartford Launches Innovative Benefit to Guarantee Principal of Variable Annuity Investors" Jul. 26, 2002.

PR Newswire Online Article, "Fortis First to Market With an Unmatched Income Benefit," Sep. 28, 1999, found at: www.prnewswire.com.

\* cited by examiner

METHOD AND SYSTEM FOR PROVIDING EMPLOYER-SPONSORED RETIREMENT PLAN

RELATED APPLICATION

The present application is related to and claims priority to U.S. Provisional Patent Application Ser. No. 60/700,503, filed on Jul. 19, 2005, entitled METHOD AND SYSTEM FOR PROVIDING EMPLOYER-SPONSORED RETIREMENT PLAN. The subject matter disclosed in that provisional application is hereby expressly incorporated into the present application.

FIELD OF THE INVENTION

This invention relates generally to financial services and products, and in particular to methods and systems for calculating and administering lifetime income distributions, both fixed and variable, from employer-sponsored retirement plans. This invention further relates to methods and systems for providing this form of lifetime income benefit under a plan's existing processes. In certain embodiments, these methods and systems will calculate and administer the distribution of a plan participant's account balance in a manner which may include a lifetime income guarantee for the life of the participant and, if elected, for the joint lives of the participant and the participant's spouse or other designee, with or without minimum income guarantees, while the participant maintains access to the account value.

The types of plans encompassed by the broader aspects of this invention are all retirement plans made available, currently or in the future, by employers for the benefit of employees, which are given preferential tax treatment under the Internal Revenue Code ("IRC"). This includes, but is not limited to, employer-sponsored retirement plans known as Profit Sharing Plans, Money Purchase Plans, 401(k) Plans, 457 Plans, 403(b) Plans, Cash Balance Plans and Supplemental Executive Retirement Plans.

BACKGROUND OF THE INVENTION

Certain embodiments of this invention alter the traditional methods and processes by which employers provide retirement benefits to their employees. Thus, a brief discussion of employer-sponsored retirement benefits may aid in the comprehension and understanding of this disclosure.

The traditional scheme upon which government and industry has relied in providing employer-sponsored retirement plans is based upon the concept that asset accumulation and lifetime payouts are separate functions that cannot be combined into a single process, and must be maintained under multiple, separate plans. This means that employers offering retirement plans as part of their employee benefits programs offer them in the form of a "Defined Benefit Plan" (the "DB Plan"), a "Defined Contribution Plan" (the "DC Plan"), or a combination of the two. DB Plans have been designed to provide a lifetime income stream which the employee cannot outlive, while DC Plans have been designed to allow employees to accumulate assets to which they have access during their retirement years. Many employers have viewed both types of plans as being necessary for a financially secure retirement for their retirees, but have been forced to establish relatively cumbersome and separate processes in order to provide for both lifetime payouts and asset accumulation.

DB Plans are generally known by employers and employees alike as "pension plans." These plans are designed to insure monthly payments to retirees which they cannot outlive. Employers, governments and unions adopted these plans to cost effectively allow their employees to retire with a measure of dignity and comfort well past the years that they could be gainfully employed. Conceptually, DB Plans operate much like very simple insurance companies. A DB Plan funds the lifetime payouts to retirees from the general assets of a plan, much like an insurance company funds lifetime payouts to annuity holders from its own assets. The retiree does not have any claim against any particular asset of the employer or the DB Plan. They have only the promise of lifetime payments from the employer.

Just as insurance companies are heavily regulated by state and federal authorities in order to protect an annuity policy holder's lifetime guarantee, so too are DB Plans heavily regulated. An entire regulatory scheme has been developed to insure that private employers sponsoring DB Plans have the financial wherewithal to fulfill this promise of lifetime benefits. There is even a set of rules under which DB Plan sponsors are required to purchase insurance from a quasi-governmental agency (the Pension Benefit Guarantee Corporation, or the "PBGC") to protect a portion of retirees' benefits should employers be unable to fulfill their funding obligations.

The benefits provided by DB Plans are well defined (thus the term "defined benefit"). Typically, the accrued benefit is based upon a formula which multiplies a particular retiree's years of service by some sort of measure (such as a dollar amount like "

25" or a percentage like "$^{1}\!/_{12}$% of final average pay"). The DB Plan participant typically has no actual account balance which is "theirs" and over which they have investment control, rarely has the opportunity to make contributions to the plan, and (except for a very narrow class of DB Plans) has no access to the assets which fund the lifetime benefit.

Unlike insurance companies, however, employers who sponsor DB Plans are not in the business of developing and providing sophisticated annuity products to meet changing employee and market needs. They often do not have the skills or the resources to provide a wide variety of features to their lifetime payout benefits which can adapt to change. Employers are severely restricted by a regulatory scheme which discourages innovation. Though these employers are seeing the changing nature of their workforce and retiree population, they find that the DB Plan is unable to meet employee and retiree demands. DB Plans are, for the most part, proverbial "one trick ponies," whose inflexibility has limited their usefulness in the current marketplace.

DB Plans are now in a state of decline. The number of DB Plans peaked in 1986 at 172,642 plans, and has since fallen to 26,000 plans in 2004, covering approximately 20 million workers. Meanwhile, DC Plans increased from 544,985 plans in 1986 to 840,301 plans in 2004, covering 51 million workers. (U.S. Department of Labor Private Pension Plan Bulletin, Winter 2001-2002, and Employee Benefit Research Institute).

For all of the above reasons, DB Plans are proving to be inadequate to the task of providing lifetime retirement income for an employer's retirees.

DC Plans provide for asset accumulation over a working career, instead of a guaranteed monthly benefit to retirees. DC Plans define how much an employer or employee can contribute to the plan, such as by specifying a percentage of annual compensation, or as a "matching" contribution based upon an employee's own contributions into the plan, and thus the term "defined contribution." The most popular of these types of plans are called "401(k) plans," though there are other types of DC Plans in existence. The retirement benefit provided by these plans typically consists solely of the account balance that the retiree accumulates while working, either through their own payroll deductions or through employer contributions.

DC Plans offer some solutions to employers concerns about DB Plans. Participants in a DC Plan maintain control of investments by selecting investment choices and, upon retirement, have full access rights to the accumulated account value. DC Plan account balances are "portable," meaning that an employee can "rollover" his or her account balance into either an IRA or, upon getting another job, to another employer's DC Plan. No insurance premiums are due to the PBGC. No actuarial computations are required. There are no minimum finding rules for most types of DC Plans. DC Plans are available to younger and older employees alike. Employees have access to finds for certain types of emergencies. There are no funding liabilities from a DC Plan which show up on a company's balance sheet. The plans are much simpler to administer and the benefit is readily visible to all employees.

A DC Plan is also attractive to employees because of the variety of investment options which are typically made available. Unlike a DB Plan, under which the employee has no investment control, the fiduciaries of a DC Plan have the ability to select and provide a series of different types of investments to plan participants, and permit employees to transfer funds between these investments as their personal situations change. DC Plans also permit periodic withdrawals under certain hardship conditions, and allow participants to borrow money from their accounts at favorable interest rates.

The decrease in DB Plans has been accompanied by an increase in DC Plans. As DC Plans replace DB Plans, employers are attempting to fashion solutions which provide some level of income protection for retirees in addition to asset accumulation and control. A common approach for DC Plan retirement distributions is to provide retirees with a "systematic withdrawal" option, which they can adjust periodically to offset increases in the cost of living. This is accomplished by the retiree directing the plan to pay monthly amounts from his or her account balance, until such time as the retiree dies or until the account value becomes zero. The withdrawal rate and actual return earned will greatly influence the length of the withdrawal period. However, there currently is no lifetime guarantee available with systematic withdrawal programs from DC Plans. If the withdrawal rate is set too high, investment performance may not be sufficient to provide for long term income for the participant. If the withdrawal rate is set too low, investment performance may be sufficient to provide for a long term income for the participant, but the participant's standard of living may be compromised. A balance, therefore, must be maintained and constantly monitored.

As a result, even with all of their attractive features, DC Plans fail to adequately protect retirees' interests beyond the years in which they can be gainfully employed. DC Plan account balances can, and do, run out. With increasing life expectancies and the possibility of decreasing social security benefits, more and more individuals may be living to advanced ages faced with the prospect of outliving their retirement savings. Currently, a 65-year old has a 55% chance of surviving to age 85. For a couple age 65, there is a 30% chance one of them will live to age 95. (Source: A2000 Individual Annuity Mortality Table).

Employers are faced with a conundrum: how do they provide a flexible retirement benefit which will protect retirees through their waning years, while preserving the valuable features of a DC Plan? There are three options currently available, none of which adequately address retirement needs:

1. Adopt both a DB and DC Plan. This "two plan" process is inflexible, expensive, does not permit the consolidation of the two benefits in the design of a retirement scheme, and is very limited in the types of lifetime income benefits that are made available.

2. Adopt a DB Plan with a benefit stated in terms of an account balance, a so-called "Cash Balance" plan. This approach lacks most of the favorable features of a DC Plan, including not typically allowing for additional employee contributions and permitting neither equity participation nor participant investment control.

3. Adopt a DC Plan which allows for payouts over a "life expectancy" rather than guaranteeing a lifetime payout; or amending a DC Plan to permit the purchase of an annuity which is not integrated with an employer-sponsored plan.

While employers can use these options to address some of the concerns discussed, they do not provide integrated retirement programs. There is, therefore, a need for processes by which an employer can provide additional forms of lifetime income to retired employees through use of existing platforms of employer-sponsored retirement plans.

SUMMARY

Described herein are systems and methods for distributing income from employer-sponsored retirement plans. The systems and methods maintain a participant account balance and operate in a manner that is superior to both annuitizations and systematic withdrawal programs currently in use. Certain embodiments provide processes which allow the plans to provide one or more of: periodic distributions with a lifetime guarantee; rights of access to account values; a death benefit; a minimum benefit payment guarantee; and the ability to add to the account balance. They are superior to existing plans because the systems and methods enable an employer to efficiently provide to its employees, in a single plan, the ability to seamlessly accumulate assets for retirement, and then to elect a lifetime stream of payments including, but not limited to, the features described. Employers are able to provide lifetime income guarantees as a retirement benefit without having to face the daunting and expensive task of adopting and maintaining a DB Plan. Employers are also able to provide a type of lifetime benefit which is otherwise unavailable from employer-sponsored DB or DC Plans and, in certain embodiments, does so from within the DC Plan itself. Certain embodiments automate the provision of a lifetime income from these plans which may, for example, provide systematic withdrawals of principal and earnings over a specified period of years and, afterwards, continue payments for the remaining life of the participant, while maintaining the DC nature of the plan and always ensuring that at least the minimum distributions required by the Internal Revenue Code are maintained.

One or more embodiments of the invention comprise a method of administering income distributions from an employer sponsored retirement plan having a participant account value. The method may comprise the steps of providing an option to a plan participant to elect a lifetime payout funded by at least a portion of the participant's account value, providing an option to the participant to elect an access period during which the participant maintains control over said portion of the participant's account value, transferring said portion of the participant's account value into a group annuity contract, determining an initial benefit payment under the terms of the group annuity contract, determining a subsequent benefit payment, and paying the initial and subsequent benefit payments to the participant. In one embodiment, the participant's control over said portion of participant's account value during the access period is governed by preexisting plan rules. The participant's control during the access period includes at least one of the right to withdraw funds, the right to direct investments, and the right to make deposits.

In certain embodiments, the initial and subsequent benefit payments are paid to the participant through existing plan processes. The initial benefit, per $1,000.00 of account value may be determined using the following factor:

$$AnnuityFactor = \frac{1,000}{\ddot{a}\frac{(m)}{AP} + \frac{v^{AP}}{(1-PT)*(1-ExpLoad)} * \ddot{a}_{x+AP}^{(m)}}$$

where:
m is the frequency of benefit payments,
ExpLoad is the provision for expenses,
x is the participant's age when the benefit payments begin,
PT is any premium tax, and
AP is the length of the annuity certain period
v is the discount factor for length of the access period.

The subsequent benefit payment may be determined for each calendar year by the following formula:

$$\text{Subsequent Benefit Payment} = \frac{CurrentAccountvalue}{\ddot{a}\frac{(m)}{AP-r} + \frac{v^{AP-r}}{(1-PT)*(1-ExpLoad)} * \ddot{a}_{x+AP}^{(m)}}$$

where:
m is the frequency of benefit payments,
ExpLoad is the provision for expenses,
x is the participant's age when the benefit payments begin,
PT is any premium tax, and
AP is the length of the annuity certain period
v is the discount factor for length of the access period
r is the number of payment periods elapsed since the benefit start date.

In certain embodiments, the subject method may include the steps of determining a total of benefit payments made in a calendar year, and comparing that total to a minimum required annual distribution amount to insure that the total is at least equal to the required minimum amount. The benefit payments may be made monthly, and benefit payments for the remainder of the calendar year which includes a benefit start date may be set equal to the initial benefit payment. In certain embodiments, the subsequent benefit payment is determined annually and paid monthly, with equal monthly payments following determination. In other embodiments, the subsequent benefit payment may be determined and paid monthly.

In certain embodiments, the method further comprises the step of providing a death benefit, based on the participant's account value, to be paid if the participant dies during a period in which an account value is available. Certain embodiments may further comprise the step of providing a joint life distribution option which may be elected by the participant. The method may also include the step of providing at least one of a lump sum death benefit and payment of lifetime benefits to a designated beneficiary upon death of the participant.

Certain embodiments of the subject method further comprise the step of providing a minimum benefit payment guarantee to ensure that subsequent benefit payments will not fall below a predetermined level. In these and other embodiments, at least one of the initial benefit payment and the subsequent benefit payment is made from a Plan Distributed Annuity ("PDA").

Certain embodiments of the invention comprise methods of administering distributions from employer-sponsored, defined contribution retirement plans having participant account balances. These embodiments may comprise the steps of providing an option to a plan participant to elect a lifetime payout funded by at least a portion of the participant's account balance, establishing an account within the plan for paying periodic guaranteed distributions to the participant in response to the election of a lifetime payout, determining a charge to be paid by the participant for the guaranteed lifetime payout, determining an amount of the guaranteed distributions and subsequently paying the distributions to the participant. Certain embodiments may further comprise the step of deducting the charge from the participant's account balance. The step of determining a charge may comprise determining a front end charge and deducting the front end charge from the participant's account balance, determining a charge to be deducted from each distribution paid to the participant, or determining an asset charge and periodically deducting the asset charge from the participant's account balance. Other comparable mechanisms for determining a charge may be employed.

In certain embodiments the step of establishing an account within the plan comprises the step of establishing a plan distributed annuity to fund the guaranteed lifetime distributions. This or other embodiments may further comprise the step of establishing a variable annuity account to find the guaranteed lifetime distributions. The step of establishing a variable annuity account may comprise the steps of maintaining an account value for a defined period of time, and providing the plan participant access to the account value. The step of providing the plan participant access to the account value may comprise the steps of permitting at least one of withdrawals from and additional deposits to the variable annuity account, and making appropriate adjustments to the account value based on any withdrawals or deposits. Certain embodiments may further comprise the additional step of establishing a predetermined withdrawal rate for a given withdrawal frequency, and providing a guarantee of continued distributions, provided that withdrawals do not exceed the predetermined withdrawal rate, even if the account value is exhausted.

Certain embodiments of the subject method may include the step of providing at least one of a death benefit and a commuted value. In these embodiments, the death benefit may be equal to the account value. The commuted value may be equal to the account value less a commutation charge. Certain embodiments may also comprise the step of providing a minimum payment guarantee. One or more embodiments of the method may comprise the step of permitting the plan participant to select investment options for the portion of the participant's account balance. These investment options may include the same, or similar, options available to the plan participant in an accumulation period under the employer-sponsored, defined contribution retirement plan. Certain embodiments may further comprise the step of providing a long term care benefit, the costs of which are deducted from the participant's account balance. These and other embodiments may further comprise the step of providing a guaranteed minimum payment benefit under the lifetime payout so that periodic benefit payments will not be less than a specified amount.

One or more of the subject methods may further comprise the steps of providing funding and administration of benefits under the lifetime payout outside of an annuity contract during a first specified period. Certain embodiments may further comprise the steps of identifying Internal Revenue Code requirements applicable to the employer-sponsored, defined contribution retirement plan, and administering distributions under the lifetime payout option so as to ensure compliance with the regulations. These or other embodiments may further comprise the step of creating a record of payments made under the lifetime payout option as part of a record keeping process used to record other forms of distributions from the employer-sponsored, defined contribution retirement plan.

Certain embodiments may further comprise the steps of periodically computing benefits under the lifetime payout option, and reporting the results of the computation to the plan participant. These results may be reported to the participant through pre-existing plan processes. These or other embodiments may further comprise the steps of providing data relating to the lifetime payout option to pre-existing plan administration processes, including one or more processes relating to plan termination, plan mergers, changes in plan administrators, changes in investment options, changes in insurance vendors and plan amendments.

Additional embodiments, features and advantages will become apparent to those skilled in the art upon consideration of the following description of the illustrated embodiment exemplifying the best mode of carrying out the invention.

DETAILED DESCRIPTION

Figure 1:
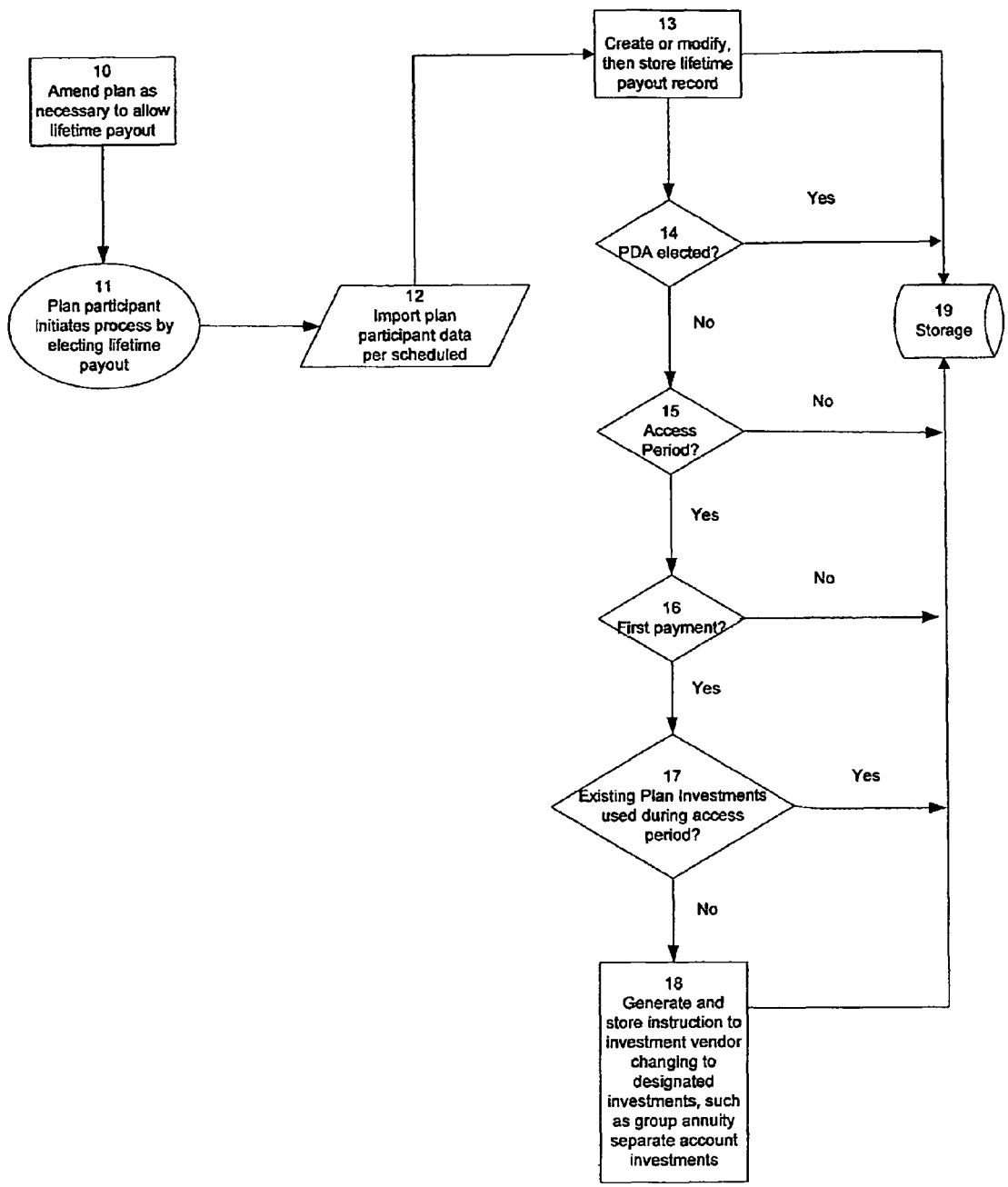
FIG. 1 is a flow chart illustrating a portion of one embodiment of the subject system and method which relates to establishing a payout record.

An employer choosing to utilize the subject system(s) and/or method(s) must first adopt, or be maintaining, a plan which describes the participant's retirement benefit in the form of an account balance. The employer must amend the plan documents and the attendant participant disclosures to allow the participants the ability to elect that all or a portion of the participants' account balances be paid as a lifetime stream of income. A retiring participant then elects, under the plan's existing processes, the portion (if any) of the account to be paid out as a lifetime income stream. Payments to the participant would be placed upon a payment schedule, and begin at the selected plan payment date. Payments will be made to the participant either through the plan's normal processes or; if elected by either the plan employer or the plan participant, through a "Plan Distributed Annuity" ("PDA") which is distributed by the plan to the participant.

A PDA is a type of annuity recognized by the Internal Revenue Code as an "in-kind" distribution of an annuity contract from the plan. It may be an immediate annuity or it may be a deferred annuity. It may be a fixed annuity or it may be a variable annuity. The exact form of annuity may be chosen by the plan. To accommodate the PDA, certain embodiments of the invention provide that a group annuity contract which is owned by the plan provides either separate investment accounts or a guaranteed lifetime stream of payments (as described herein), and may also issue individual PDAs on behalf of the plan to plan participants. A participant's account balance or promise of a lifetime income guarantee are transferred to the PDA, then issued to the plan participant. These PDAs are favored tax vehicles under which a plan participant receives the same beneficial treatment and protections under the Internal Revenue Code as does participants who remain in a plan which fully integrates this feature into its ongoing processes. Lifetime benefits would be computed in the same manner as benefits that remain integrated with the plan. The plan sponsor may have the ability to choose the underlying investment funds in the PDA. The plan participants have all of the same benefits as earlier described above. However, under a PDA, it is the insurance company which administers the program.

Throughout any access period elected by the participant, the participant will have full rights to the account balance in the plan, as otherwise described by the plan, including the right to withdraw funds or change investments. Any such activity would result in recalculation of the participant's lifetime stream of income. After any access period ceases, the participant may still be able to change the manner in which the underlying investments supporting the lifetime payouts are managed (should this option be made available by the plan). The ability to have lifetime, fixed payments made to plan participants through existing plan processes may also be provided.

The subject systems and methods integrate the payment of a lifetime stream of income with a participant's continued use and access to the participant's account balance in a plan by utilizing that account balance in determining the amount upon which a lifetime stream of income is computed. In using the account, the plan rules governing that account are preserved during any access period required by a lifetime income program, including the right to direct the investment of the account, rollover deposits into the account, and make withdrawals from the account.

The retention of the participants' rights to plan account balances is a feature which helps successfully integrate the subject system/method into the plan's processes. Retention of participant account balance rights is accomplished in one of two ways during any access period permitted by the lifetime income design. First, participants will continue to be allowed to remain invested in the same investment funds as other participants who have not elected lifetime income payments. Second, electing participant account balances are deposited in separate accounts of a specially designed group annuity owned by the plan, which account balances are invested in the same or similar funds that are otherwise available to plan participants not electing lifetime income streams. In either case, an automated system/method is provided to use those balances in computing the amount of the periodic payment under the lifetime income stream. A common custodial arrangement may be provided to facilitate the plan's trading practices between its investment funds.

The ability to integrate with a participant's account within the plan enables the plan to utilize its entire array of existing administrative functions to support the regulatory and customer service requirements demanded in providing the lifetime benefit in the same manner as it would for those participants not electing the lifetime benefit. For example, any participant statements, trade confirmations, plan financial statements, distribution tax reporting and withholding, internet access, and the like would all be handled through the plan's existing processes. Any features or investments of the plans which were changed through the plan's normal processes would then flow through to the participants electing lifetime income streams.

Once any access period which may be permitted by the plan is exhausted, a participant's account balance within the plan is transferred to a group annuity contract or, if applicable, out of the variable separate accounts of a group annuity contract. At that point, the insurance company, not the plan, guarantees a lifetime income stream on behalf of the plan to the plan participant. Should the plan provide a stream of lifetime income which varies based upon underlying equity fund performance, such funds may be selected by the plan. Continued payments from the annuity contract may be made through the plan's existing administrative processes.

DETAILED DESCRIPTION OF THE FIGURES

Figure 2:
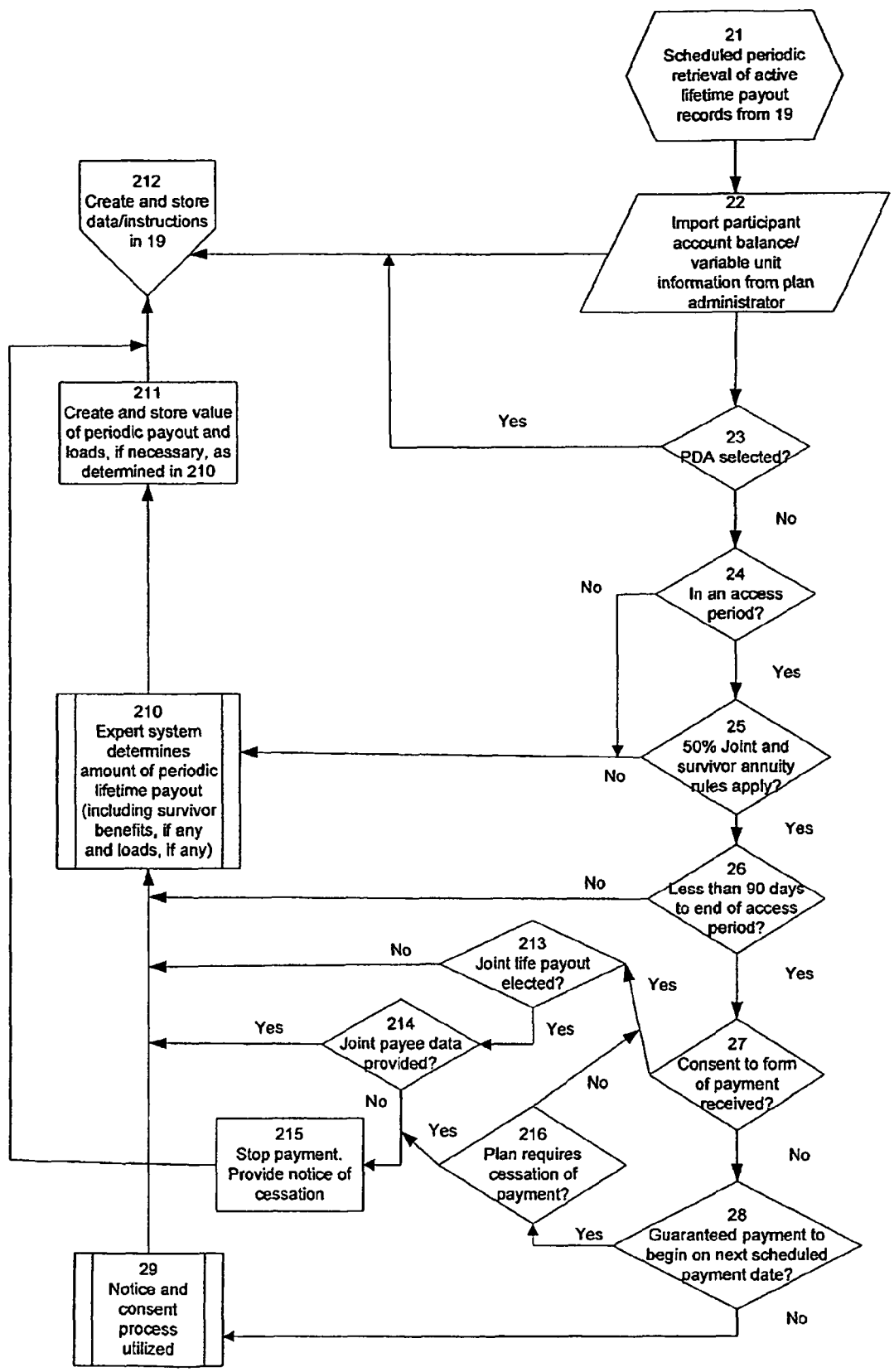
FIG. 2 is a flow chart illustrating a portion of one embodiment of the subject system and method which relates to establishing and modifying a lifetime payout amount.
Figure 3:
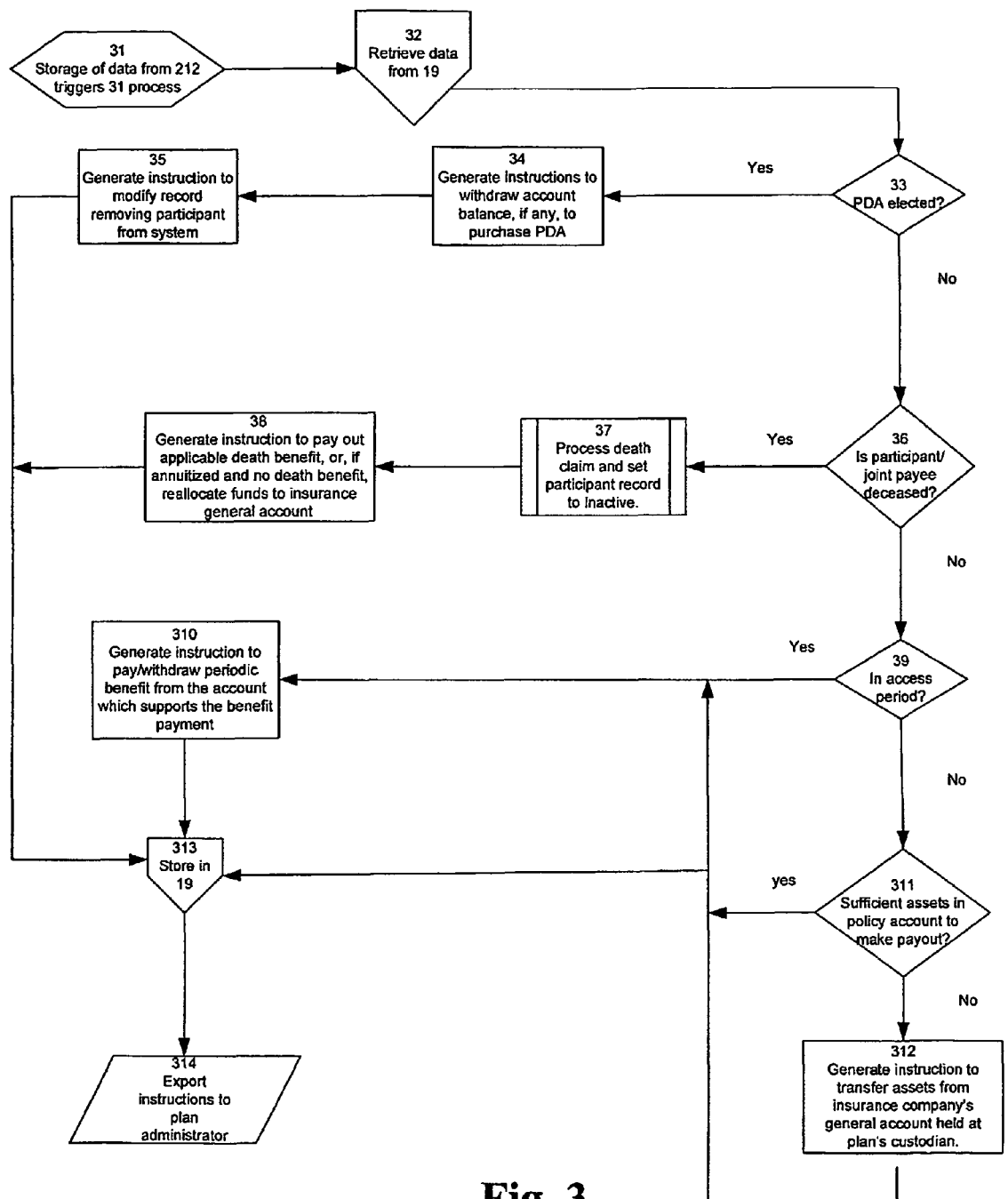
FIG. 3 is a flow chart illustrating a portion of one embodiment of the subject system and method which relates to executing a lifetime payout amount.

FIGS. 1-3 are flow charts illustrating an illustrative embodiment of the subject system and method. The subject embodiment is intended to be exemplary and is not intended to be construed as limiting the scope of the invention in any manner.

FIG. 1 is a flow chart illustrating a portion of one embodiment of the subject system and method. The portion of the embodiment illustrated in FIG. 1 relates to establishing a payout record.

The first operation in the embodiment illustrated in FIG. 1 involves amending an existing plan, as necessary, to allow for benefits to be distributed as a lifetime payout stream (10). To the extent a plan has such capability at its creation, such amendment will not be necessary. Once a plan is established or properly amended to provide a lifetime payout stream, use of the system and method is initiated by a plan participant electing the lifetime payout stream as a plan benefit (11). This election by the plan participant is made using the existing processes established by the plan (such as electronic, voice, or paper election methods). The lifetime form of benefit payout is described in the plan materials, which include this benefit option along with other benefit distribution options. Also included in this election is the choice of having the lifetime income stream paid through the plan's process, or through an independent process such as through the use of a "Plan Distributed Annuity" ("PDA"). In certain embodiments, the election to be paid through a PDA can be made even after an initial election had been made to have the payments paid through the plan.

The plan administrator collects this data and enters it into the plan's system. The first subprocess imports the plan participant data from the plan administrator's system (12), which aligns and integrates the data used by the system and method with the data used by the plan administrator in the plan's day-to-day operations. The subject invention is intended for use by a wide variety of plans with varying types of systems, and the use of data feeds from diverse plans is anticipated.

Next, the subject system and method creates a lifetime payout record (13) from the administrator's data feed. The data is sorted and stored for use by the other subprocesses to determine the amount of the payout and the manner in which it will be distributed.

The system and method then determines (14) if the next payment in the series of lifetime payouts will be made through an independent process under a PDA. The reference to a "PDA" throughout this description is a generic reference to the payment of the lifetime payout through the use of an annuity contract held outside of the plan (typically owned by the former plan participant, but could also be the employer). For example, under a 401(k) plan, such an annuity would be a "PDA" as that term is defined by the Internal Revenue Code; under a 403(b) plan, the vehicle would be a "90-24 Transfer," as that term is described under Revenue Ruling 90-24; under a 457(b) payout the vehicle may simply be a non-qualified annuity. Any such PDA may either be a group or individual annuity. Election of a PDA may occur either initially, or through a change to an earlier election of lifetime payouts through the plan. This PDA choice can also be made by plan sponsors at the time of plan termination or some other plan transition. This information is then stored in master storage (19).

If a PDA is not elected, the system and method inquires as to whether or not the type of lifetime payout which was elected provides participants the right to withdraw funds from the account from which the lifetime payouts will be made and, if so, for what period of time the participant will have this right (15). This period of time is referred to as an "access period." It is contemplated that there will only be a limited number of access periods, as chosen by the plan sponsor, investment manager or any party administering the plan. This information is then stored in master storage (19).

The system and method then inquires as to whether or not this is an initial election or a change in a previously made election, stating it in terms of whether or not the action is a "first payment" (16) in an access period. The answer to this question determines whether or not the system and method needs to generate trading instructions for the plan's administrators to properly move a participant's investments to the funds from which lifetime payouts will be made. If this is not a first payment of an access period (but instead, for example, merely a change to an access period), this information is stored in master storage (19).

If this is the first payment during an access period, the system and method determines whether the payment will be made from funds in existing plan investments. If the payment will be made from funds in which the participant is already invested, this information is stored and no trading instructions are generated. If the payments will be made from certain designated investments other than those in which the participant is already invested (including, but not limited to, separate accounts of a group annuity contract), the system and method generates a trading instruction to the plan's administrator to move the participant's funds to those designated investments (18). These instructions are then stored in master storage (19).

FIG. 2 is a flow chart illustrating a portion of one embodiment of the subject system and method. The portion of the embodiment illustrated in FIG. 2 relates to establishing and modifying the lifetime payout amount.

The portion of the system and method illustrated in FIG. 2 is periodically activated by an automatic calendar, whereby data is drawn from the master storage according to a prearranged schedule (such as monthly) (21). This operation may also be manually initiated periodically, or at other non-periodic times. Because the amount and form of the lifetime payout made through the plan's processes may change from period to period (such as, from month to month), this subroutine is preferably run before any periodic payment is made.

Data is retrieved from master storage (19), and account balance is imported from the plan's administrative system (22), which is then also stored (19). A determination is then made as to whether or not a PDA has been elected (23). If a PDA has been elected, this information is stored. If a PDA has not been elected, an inquiry is made as to whether or not an access period was elected, and whether there is any time remaining in an access period (24). If the answer is no, or if there is no time remaining in the access period, the benefit is in the formal annuitization stage. This information is then relayed to a separate process which uses that information to compute the value of the annuitized periodic payout (210). In the annuitization stage, the benefit will be calculated from performance units, rather than from performance of the separate account.

If there is an access period, an inquiry is made as to whether or not the plan or the distribution is subject to the joint and survivor annuity rules (QJSA) imposed by the Internal Revenue Code and the Employee Retirement Security Act of 1974 (ERISA) (25). If these rules are applicable, they will affect the form of, and thus the amount of, the payment and an inquiry is made as to how much time is remaining in that access period (26). The rule is that a participant must be notified between 30 and 90 days before the actual annuitization of the benefit which occurs after the end of an access period, and in which time the form of annuity benefit (for example, single life annuity or term certain) must be selected. Spousal consent is required if the election is for something other than a 50% joint and survivor annuity. A notice/consent form is generated which will also describe the other distribution options which may be available to the participant. If there are 90 days or more, or 30 days or less, remaining before the end of the access period, and no waiver has been received, that fact is transferred to an expert system (210), and the calculation of the amount of payout is triggered.

If there are less than 90 days remaining (26) in the access period, an inquiry is made as to whether or not the required consent forms have been received (27). The notice and consent requirements will determine whether the benefit is payable as a 50% joint and survivor annuity, or in a form otherwise chosen by the participant. If the consents have been received, the system/method determines whether a joint life payout has been elected (213). If not, this information is directed to the expert processes for calculating benefits (210), and the benefits will be determined accordingly. If a joint life payout has been elected, the system/method determines whether joint payee data has been provided (214). If yes, the system/method proceeds to calculate benefits (210) as previously discussed. If joint payee data has not been provided, the system/method stops payment and provides a notice of cessation (215). Data relating to these operations is then stored (19).

If the consents (27) have not been received, and the next scheduled payment is not the first annuity payment (28), then consents are requested by an independent, pre-existing process (29). If consents have not been received, and the next scheduled payment is the first annuity payment, the system/method determines whether the plan requires a cessation of payment (216). If yes, payment is stopped and a notice of cessation is generated (215), and this information is stored (19). If the plan does not require cessation of payment, the system/method determines whether a joint life payout has been elected (213). After this determination, the system/method proceeds as previously described (213, 214, 215). If appropriate this information is then directed to the expert processes for calculating benefits (210), and any such benefit will be calculated under the default form of benefit required under the plan or under law. This procedure applies until the first scheduled payment after the first annuity payment is made.

Input from operations 25, 26, 213, 214 or 29 triggers 210 to perform a calculation of the next periodic payout, drawing data as necessary from 21 or 19. An example of such a system used to determine periodic payments is described above. The system will also calculate any loads or expenses which may be related to the provision of the benefit, and the value of the survivor benefit if the plan participant is deceased. Both the amount of the payout and the loads are stored and transferred to master storage (211, 212).

FIG. 3 is a flow chart illustrating a portion of one embodiment of the subject system and method. The portion of the embodiment illustrated in FIG. 3 relates to executing the lifetime payout.

The portion of the embodiment illustrated in FIG. 3 is triggered by storage of data through 212. Once triggered (31), the information needed to execute the payout is retrieved (32) from master storage 19. An inquiry is made as to whether a PDA has been elected (33). If so, instructions are generated to the plan administrator to withdraw the participant's account balance, if any, up to the amount elected by the participant, and to purchase a PDA (34). If a PDA is elected, the plan participant's lifetime records are removed from the system, and will no longer be held and processed with other lifetime payments within the plan (35). This information is then stored in master storage 19.

If a PDA has not been elected, an inquiry is made as to whether or not the participant or joint payee is deceased (36). If so, a death claim is processed and the participant record is set to inactive (37). An instruction is generated to either pay out the death benefit as a lump sum or in installments or, if annuitized, transfer any amounts allocated to the account back to the insurance company account (38). If the participant/joint annuitant is alive, an inquiry is made as to whether an access period is in effect (39). If so, an instruction is generated for the plan administrator to withdraw the periodic benefit payment from the account within the plan (or plan owned annuity contract, if applicable) (310). If there is no access period, then payments are in an annuitization phase. Payment during the annuitization phase requires the ability to continue to make payments to plan participants beyond their calculated life expectancies. Therefore, the subject system/method is designed to direct payments from an insurance company's assets, if necessary, in a way which is transparent to the plan administrator. A determination is made as to whether the assets allocated to a participant's lifetime annuitization account have been exhausted (311). If not, an instruction is generated to withdraw the periodic payment from the account. If so, an instruction is generated to transfer a predetermined amount from the insurance company's general account to the policy account supporting the periodic payments (312).

All of the instructions generated by this sub-routine are stored (313) in master storage 19. After all instructions are stored, a data feed is automatically generated to the plan's administrator (314). This data feed orders a distribution from the plan under its normal distribution processes; orders investment instructions under the plan's normal administrative processes; identifies a withdrawal to be paid as a premium for a PDA; orders a death benefit distribution; and/or updates the administrator's records. Any applicable tax reporting and withholding will be handled through the plan's existing administrative processes.

Although the present invention has been described with reference to a particular system/method, one skilled in the art can easily ascertain from the foregoing description the characteristics of the invention. Various changes and modifications may be made to adapt the various uses and characteristics without departing from the spirit and scope of the invention.

What is claimed is:

1. The computer-implemented method for use with a computer of the type used to administer an employer-sponsored, defined contribution retirement plan having participant account balances, comprising the steps of:

provinding options to a plan participant to elect a lifetime payout funded by at least a portion of the participant's account balance, said options including an option to elect lifetime payments paid through the plan, and an option to elect lifetime payments paid through a Plan Distributed Annuity ("PDA");

providing funding and administration of benefit payments under the lifetime payout outside of an annuity contract during a first specified period; and using the computer:

inputting a lifetime payout election by a participant, said election including either said election for lifetime payments paid through the plan, or for lifetime payments paid through the PDA;

for each plan participant electing a lifetime payout, importing and storing participant data from the plan, said data including data representative of said portion of the participant's account balance funding the lifetime payout;

creating and storing a lifetime payout record for said participant;

using said portion of the participant's account balance, computing an amount of a periodic benefit payment under the elected lifetime payout; and if a PDA is elected by the plan participant or administrator:

generating an instruction to withdraw said portion of the participant's account balance to purchase a PDA; and generating an instruction to modify the participant's payout record to reflect purchase of the PDA; and if a PDA is not elected:

establishing an account within the plan for paying periodic distributions to the participant in response to the election of a lifetime payout;

periodically retrieving the plan participant's lifetime payout record from storage;

generating an instruction to pay the lifetime payout benefit payment from the account established within the plan; and recording the payment in the participant's lifetime payout record and re-storing said record.

2. The computer-implemented method of claim 1, further comprising the step of providing a guarantee and, using the computer, generating an instruction to pay the lifetime benefit payment pursuant to the guarantee in the event the account established within the plan has insufficient assets to fund the benefit payment.

3. The computer-implemented method of claim 2, further comprising the step of determining a charge to be paid by the participant for the guarantee.

4. The computer-implemented method of claim 3, further comprising the step of deducting the charge from at least one of the participant's account balance and the account established within the plan for paying periodic distributions to the participant.

5. The computer-implemented method of claim 3, wherein the step of determining a charge comprises determining a front end charge, and further comprising the step of deducting the front end charge from at least one of the participant's account balance and the account established within the plan for paying periodic distributions to the participant.

6. The computer-implemented method of claim 3, wherein the step of determining a charge comprises determining a charge to be deducted from each benefit payment paid to the participant.

7. The computer-implemented method of claim 3, wherein the step of determining a charge comprises the step of determining an asset charge, and further comprising the step of periodically deducting the asset charge from at least one of the participant's account balance and the account established within the plan for paying periodic distributions to the participant.

8. The computer-implemented method of claim 1, wherein the step of establishing an account within the plan comprises the step of establishing a variable annuity account to fund the periodic distributions.

9. The computer-implemented method of claim 8, wherein the step of establishing a variable annuity account comprises the steps of maintaining an account value for a defined period of time, and providing the plan participant access to the account value.

10. The computer-implemented method of claim 9, wherein the step of providing the plan participant access to the account value comprises the steps of permitting at least one of withdrawals from and additional deposits to the variable annuity account, and the step of making adjustments to the account value based on said withdrawals and deposits, if any.

11. The computer-implemented method of claim 10, comprising the additional step of establishing a predetermined withdrawal rate for a given withdrawal frequency, and providing a guarantee of continued distributions, provided that withdrawals do not exceed the predetermined withdrawal rate, even if the account value is exhausted.

12. The computer-implemented method of claim 8, further comprising the step of providing a minimum payment guarantee associated with the variable annuity account and the step of, using the computer, setting the amount of the periodic benefit payment to a minimum payment amount if the amount of the payment computed using said portion of the participant's account balance is less than the minimum payment amount.

13. The computer-implemented method of claim 1, comprising the additional step of providing at least one of a death benefit and a commuted value.

14. The computer-implemented method of claim 13, wherein the death benefit is equal to an account value of the account established within the plan for paying periodic distributions.

15. The computer-implemented method of claim 13, wherein the commuted value is equal to an account value of the account established within the plan for paying periodic distributions.

16. The computer-implemented method of claim 1, further comprising the step of permitting the plan participant to select investment options for said portion of the participants account balance.

17. The computer-implemented method of claim 16, wherein said investment options include substantially the same options available to the plan participant in an accumulation period under the employer-sponsored, defined contribution retirement plan.

18. The computer-implemented method of claim 1, further comprising the step of providing a long term care benefit, the costs of which are deducted from at least one of the participant's account balance and the account established within the plan for paying periodic distributions to the participant.

19. The computer-implemented method of claim 1, further comprising the step of providing a guaranteed minimum payment benefit under the lifetime payout so that periodic benefit payments will not be less than a specified amount.

20. The computer-implemented method of claim 1, further comprising the steps of identifying Internal Revenue Code requirements applicable to the employer-sponsored, defined contribution retirement plan, and administering distributions under the lifetime payout option so as to ensure compliance with said regulations.

21. The computer-implemented method of claim 1, wherein said step of recording payments made under the lifetime payout option is part of a record keeping process used to record other forms of distributions from the employer-sponsored, defined contribution retirement plan.

22. The computer-implemented method of claim 1, further comprising the steps of periodically computing benefits under the lifetime payout option, and reporting the results of the computation to the plan participant.

23. The computer-implemented method of claim 22, wherein said results are reported to the participant through pre-existing plan processes.

24. The computer-implemented method of claim 1, further comprising the steps of providing data relating to the lifetime payout option to pre-existing plan administration processes, including at least one of processes relating to plan termination, plan mergers, changes in plan administrators, changes in investment options, changes in insurance vendors and plan amendments.

* * * * *